Figure 1:
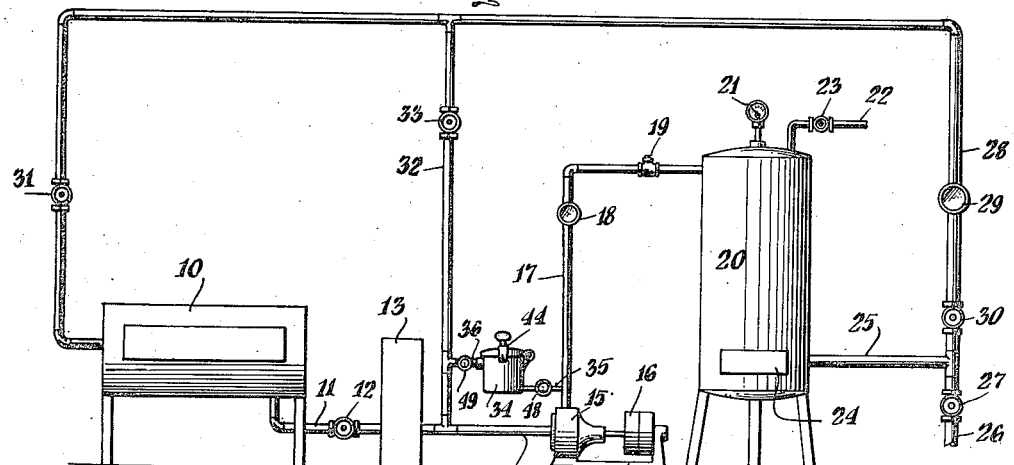

Oct. 19, 1948.   W. E. CALDWELL   2,451,715
INJECTOR APPARATUS
Filed Sept. 14, 1945

INVENTOR
William E. Caldwell
BY Duell, Kane & Smoot
ATTORNEYS

Patented Oct. 19, 1948

2,451,715

UNITED STATES PATENT OFFICE 2,451,715

INJECTOR APPARATUS

William E. Caldwell, New York, N. Y., assignor to Carman & Co., Inc., New York, N. Y., a corporation of New York Application September 14, 1945, Serial No. 616,252

3 Claims. (Cl. 259—4)

This invention relates to improved injector apparatus particularly apparatus for introducing filter, purifying aids and other materials into the solvent in a dry cleaning system.

Various filter and purifying aids are used in dry cleaning systems to clarify the solvent and remove impurities and odors therefrom and for the purpose of coating the filters, helping to prevent clogging of the filters and aiding in the operation thereof. These filter and purifying aids are frequently known as powders and usually consist of a diatomaceous earth, fuller's earth, activated clay, activated carbon or some similar medium. Heretofore filter and purifying aids have usually been introduced into the solvent through the washer, the button trap or a special powder trap provided for that purpose. The present methods and apparatus for introducing these aids are not satisfactory and give rise to difficulties. Thus, one of the problems encountered through present methods and apparatus is known as "dusting" in which a residue of the filter or purifying aid is left in the garments being cleaned in the washer. Another problem is filter pressure or clogging of the filters due to the sporadic, uneven introduction of the filter and purifying aid into the system. Another problem is the layering of the soil and the filter aids that is a layer of relatively clean powder is covered with a layer of soil laden powder instead of being a homogeneous bed of soil laden powder.

It is an object of the present invention to overcome the above and other difficulties heretofore encountered and to provide injector apparatus whereby filter and purifying aids may be readily introduced into the solvent in a dry cleaning system at a uniform and consistent rate and during the period of time selected by the operator.

A further object is the provision of improved injector apparatus of the above character which simplifies the job of introducing filter and purifying aids into the solvent in a dry cleaning system and which minimizes the danger of filter pressure or filter clogging due to the fact that the filter aid may be introduced at a substantially uniform rate over the required period of time during the operation of the system.

A further advantage of my apparatus is that it does not require any extensive alterations in present dry cleaning systems and can be readily connected to the circuit of existing systems. Other advantages are that mothicidal insecticidal soap and other agents may also be introduced by such an apparatus. My improved apparatus is also of inexpensive, simple construction and will give satisfactory service over a long period of time.

Figure 4:
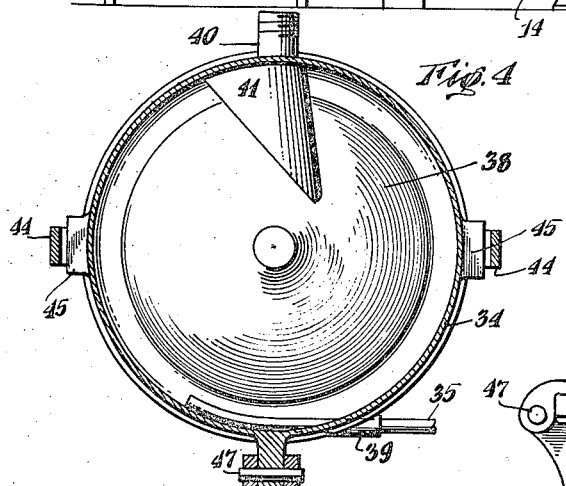
Figure 2:
Figure 2:
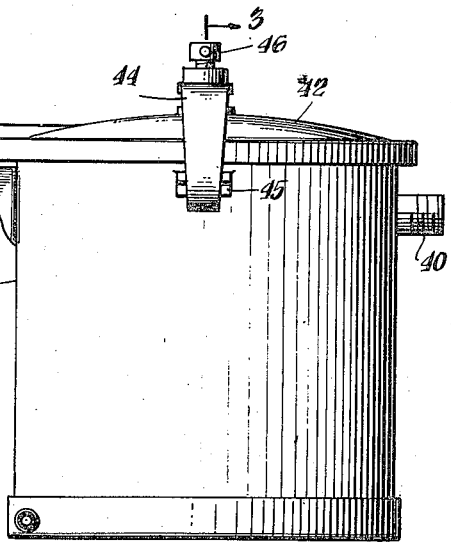
Figure 3:
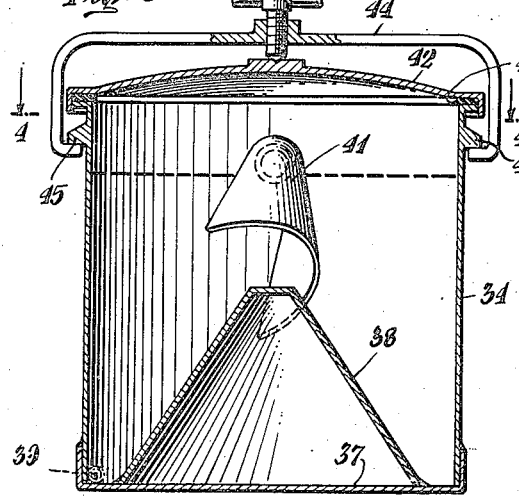

Other objects and advantages will be apparent from the accompanying drawing in which, Fig. 1 is a diagram of a dry cleaning system having incorporated therein injector apparatus embodying my invention, Fig. 2 is an elevational view of the injector apparatus, Fig. 3 is a sectional view at right angles to Fig. 2 on the line 3—3 of Fig. 2 and Fig. 4 is a sectional plan view on the line 4—4 of Fig. 3.

My improved injector apparatus is particularly adapted for use in dry cleaning systems and in Fig. 1 I have shown it incorporated in one conventional type of dry cleaner.

The system comprises a dry cleaning washer or wheel 10 connected by pipeline 11 having valve 12 therein to button trap 13 which is intended to trap buttons or similar solid particles in the dry cleaning solvent. Button trap 13 is in turn connected by pipeline 14 to pump 15 which is driven by motor 16. The pump is in turn connected by pipeline 17 having sight glass 18 and check valve 19 therein to filter 20 which is provided with a pressure gauge 21 and an air outlet line 22 controlled by valve 23. The filter may also be provided with a cleaning opening 24. At its lower end the filter is connected by pipeline 25 to a T which in turn connects to filter drain 26 controlled by valve 27 and also to pipe 28 having a sight glass 29 and valves 30 and 31 therein. Pipeline 28 connects back to dry cleaning washer or wheel 10. A bypass 32 having valve 33 therein connects between the pipe 28 and pipeline 14.

The system and apparatus so far described are conventional and well known and are operated in a well known manner. Thus, the garments to be cleaned are placed in the dry cleaner washer or wheel 10 filter powder is introduced into the solvent for pre-coating the filter and the system is operated on the "break run" by circulating the solvent through the washer, button trap, pump filter and pipeline back to the washer again. After the completion of the "break run" the system is operated on the "soap run" by closing valves 31 and 12, opening valve 33, and circulating the solvent through the bypass. Upon completion of the "soap run," filter powder is again introduced into the system, bypass valve 33 is closed, valves 31 and 12 are opened and the system is operated on the "rinse run" with the solvent circulating once again through the washer, button trap, pump, filter and pipeline back to the washer.

The method of operation just described is one conventional and standard method of operating a dry cleaning system. Modified methods of operation are also well known such as omitting the "break run."

To facilitate the introduction of the filter powder and other filter and purifying aids and to improve the operation of the system and minimize the danger from faulty, improper or uneven introduction of the filter and purifying aids I provide my improved injector apparatus indicated generally at 34 having its inlet connected by line 35 to pipeline 17 on the pressure side of the pump and its outlet connected by line 36 to bypass 32 which in turn connects to pipeline 14 on the suction side of the pump. In systems not equipped with a bypass, outlet line 36 can be connected directly to line 14.

My improved injector apparatus 34 comprises a cylindrical casing closed at the bottom as shown at 37 and having a central truncating, conical core 38 mounted on the bottom closure and extending upwardly inside the container. The base of the core is preferably of smaller diameter than the internal diameter of the container and an inlet nozzle 39 which connects with line 35 outside of the injector discharges tangentially inside the container in the manner shown. An outlet 40 which connects with line 36 communicates with the interior of the container a spaced distance above the inlet nozzle 39 and preferably above the upper end of core 38.

Arranged around the top of the outlet 40 is a discharge baffle 41 which extends downwardly beneath the lower portion of the outlet 40 on both sides and in front thereof so that the baffle opening is disposed beneath the solvent level when the device is in operation and thereby prevents the introduction of air into the system. Due to the tangential arrangement of nozzle 39 the solvent which is discharged therefrom in the interior of the container will be caused to circulate around the core 38 in a clockwise direction as viewed in Fig. 4 and this rotary motion continues in the pool of solvent disposed above the core. The opening formed by discharge baffle 41 faces downwardly and in a counter-clockwise direction as shown so that the solvent will impinge against the interior of the baffle and be directed towards the outlet 40.

Instead of using merely one inlet nozzle 39 as shown any desired number of nozzles may be employed, however, the capacity of outlet 40 should exceed the combined capacities of the inlet nozzles under pressure.

A suitable closure may be provided for my injector apparatus for use in certain types of systems and this closure may take the form of a dome shaped cover 42 fitted over the upper end of the container and having a gasket 43 made of suitable solvent resisting material such as leather or solvent resisting plastic interposed between the periphery of the container and the cover. The cover may be held in position by a bracket 44 disposed across the top of the cover and engaging beneath lugs 45 formed on diametrically opposite sides of the container. The bracket is provided with a centrally located threaded aperture which receives the thumb screw 46 which can be adjusted to exert pressure against the central portion of the cover and thereby hold it in position. The cover may be hingedly connected to the container, if desired, as shown at 47.

The injector apparatus is connected in a dry cleaning system in the manner shown and previously described, i. e., the inlet is connected to the pressure side of the pump between the pump and filter and the outlet is connected to the suction side of the pump between the washer and the pump. In connecting the injector apparatus in this manner valves 48 and 49 are preferably, although not necessary, provided in lines 35 and 36.

The dry cleaning system is then operated in a conventional manner as, for instance, in accordance with the method previously described. However, the filter and purifying aid is introduced into the system through injector apparatus 34. This is accomplished by inserting the required quantity of filter or purifying aids into the injector and leaving the valves 48 and 49 in open position. A portion of the dry cleaning solvent will be forced through line 35 and nozzle 39 into the injector apparatus and will circulate in a rotary direction around the inside thereof until it reaches the level indicated in dotted lines in Fig. 3 when it will begin to discharge through the discharge pipe and line 36 back into the system. As the solvent circulates in this fashion a certain quantity of the powder or other filter or purifying aid is entrained or carried with the solvent into the system and circulates through the pump to the filters.

Due to the arrangement shown and described a substantially uniform quantity of the powder or other aid is introduced into the system over the desired period of operation until all of the powder has been consumed. During the normal operation of the apparatus, the solvent is at the level indicated in dotted lines in Fig. 3 and baffle 41 is submerged beneath the solvent level. Accordingly, no air can enter the system at this point. Thus a uniform amount of powder is deposited upon the filters throughout the desired period of operation without the undesirable introduction of air into the system.

It will thus be seen that I have provided improved injector apparatus for introducing filter and purifying aids into the solvent in a dry cleaning system. Modifications may be made in the illustrated and described embodiment without departing from my invention as set forth in the accompanying claims.

I claim:

1. Injector apparatus comprising a casing, a tapered core projecting upwardly in the central portion of the casing from the lower end thereof, an inlet nozzle communicating with the interior of the casing and discharging in a tangential direction around the lower portion of the core, an outlet having greater capacity than the inlet nozzle formed in the casing above the core, and a baffle disposed around the upper portion of the outlet and extending downwardly around the sides and front thereof to a point beneath the lowermost point of the outlet and terminating at its lower end in an opening facing in an opposite direction to the direction of discharge of the inlet nozzle.

2. Injector apparatus comprising a casing, an inlet discharging into the lower portion of the casing in a tangential direction, an outlet provided in the casing at a point above the inlet and a baffle disposed around the upper portion of the outlet and extending downwardly around the sides and front thereof to a point beneath the lowermost point of the outlet and terminating at its lower end in an opening facing in an opposite direction to the direction of discharge of the inlet nozzle.

3. Injector apparatus comprising a casing, an inlet nozzle communicating with the interior of the casing at the lower portion thereof and discharging in a tangential direction, a tapered core projecting upwardly in the central portion of the casing from the lower end thereof, an outlet of greater capacity than the inlet formed adjacent the upper portion of the casing and a baffle disposed around the upper portion of the outlet and extending downwardly and outwardly from around the top thereof to a point beneath the lowermost point of the outlet and terminating at its lower end in an opening facing in an opposite direction to the direction of discharge of the inlet nozzle.

WILLIAM E. CALDWELL.

REFERENCES CITED

The following references are of record in the file of this patent:

UNITED STATES PATENTS

| Number | Name | Date |
| --- | --- | --- |
| 671,075 | White | Apr. 21, 1901 |
| 1,163,097 | MacDonald | Dec. 7, 1915 |
| 1,354,850 | Schneider | Oct. 5, 1920 |
| 1,706,418 | Sissom | Mar. 26, 1929 |
| 1,874,798 | Peglar | Aug. 30, 1932 |
| 1,944,836 | Cowles | June 23, 1934 |
| 1,991,148 | Gephart | Feb. 12, 1935 |